Aug. 22, 1933.   H. C. WEBER ET AL   1,923,289
CONVERSION OF HYDROCARBONS
Filed June 26, 1930
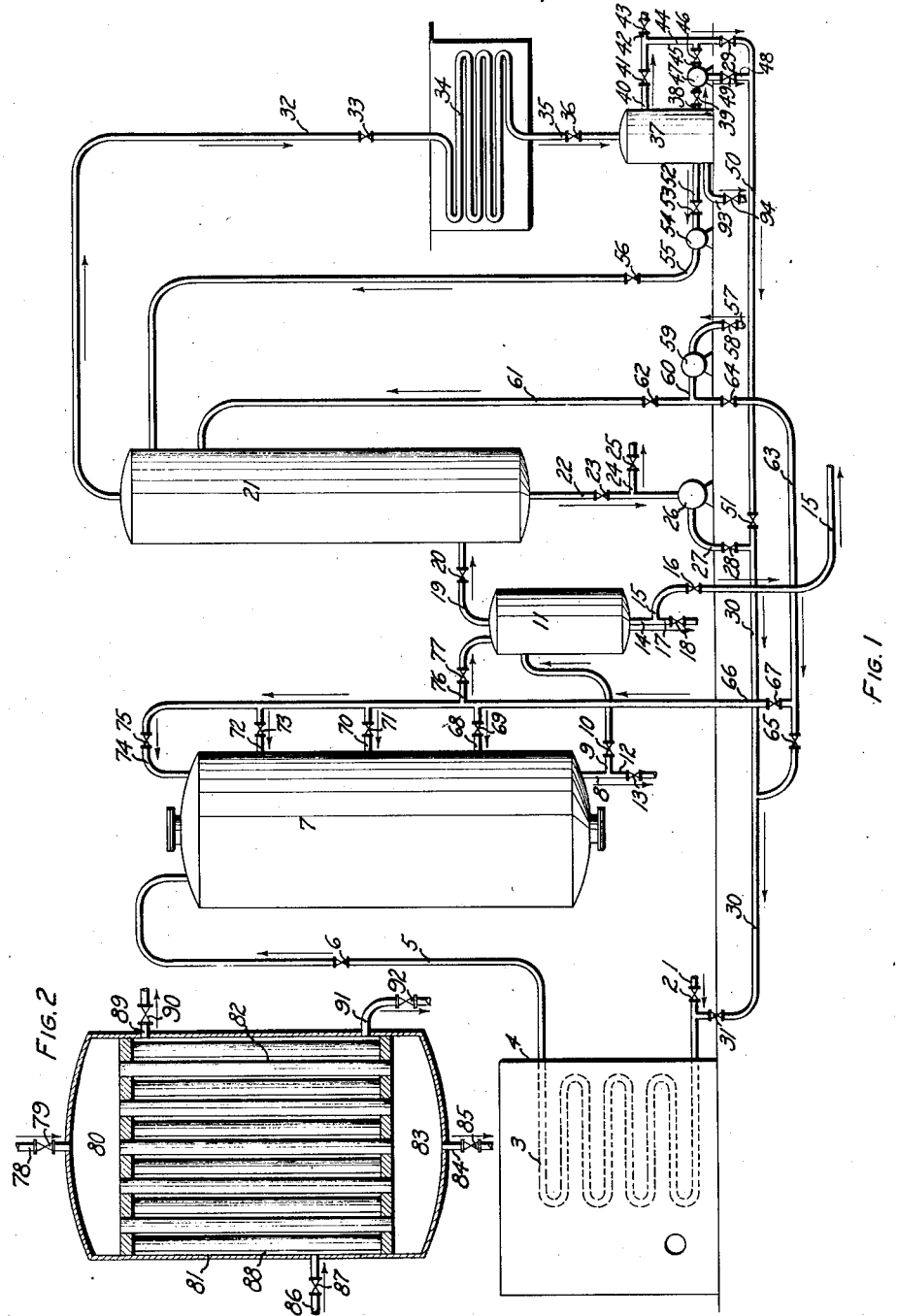
INVENTOR
Harold C. Weber
William H. McAdams
BY Frank L. Belknap
ATTORNEY Patented Aug. 22, 1933

1,923,289

UNITED STATES PATENT OFFICE 1,923,289

CONVERSION OF HYDROCARBONS

Harold C. Weber, Milton, and William H. McAdams, Brookline, Mass., assignors to Universal Oil Products Company, Chicago, Ill., a Corporation of South Dakota Application June 26, 1930. Serial No. 463,891

2 Claims. (Cl. 196—10)

This invention relates to a process for the conversion of fixed hydrocarbon gases into liquid hydrocarbons. More particularly, the desired reactions are secured through the proper correlation of pressure, temperature and reaction time for the particular fixed gas serving as the charging stock.

We have discovered that catalysts are unnecessary to accomplish the purpose, but that large ultimate yields of liquid products of the desired boiling range will be obtained if reaction time and reaction temperature are properly correlated. Even with proper correlation of reaction time and reaction temperature, increased pressure increases the percent conversion of the fixed gas into the desired liquid products. However, at a given pressure and reaction temperature, the use of too long a reaction time, in the hope of increasing the conversion of the gas into liquid products, results in the production of unduly large proportions of tarry materials, probably brought about by over-polymerization. Therefore, in order to secure high ultimate yields of liquid products having boiling ranges similar to those of gasoline and kerosene, with minimum production of tar and pitchy substances, it is desirable to so regulate the reaction time, reaction temperature and reaction pressure as to obtain a relatively small proportion of liquid products per pass through the heating and reaction zones, then to pass the vapors from the reaction chamber to the dephlegmator where the temperature is reduced, returning any heavy liquid fractions from the bottom of the dephlegmator to the inlet of the heating zone. After cooling the vapors from the top of the dephlegmator and separately withdrawing from the process the condensed liquid portion, the residual gases from the receiver are returned, in whole or in part, to the inlet of the heating zone for further treatment. In some cases the temperature of the heated mass entering the reaction zone is sufficiently low to permit the withdrawal of a small stream of tar from the bottom of the reaction vessel, but in other cases the temperature of the heated mass entering the reaction chamber is so high that any tar-like substance produced will be coked in the reaction chamber.

Fixed or so called non-condensable hydrocarbon gases from various sources may serve as a raw material for this process. Apparently the higher the proportion of olefinic hydrocarbons in the fixed gases used as charging material, the more readily is the conversion to the desired liquid products secured. Since non-condensable gas from certain vapor phase cracking processes contains relatively large proportions of these olefinic gases, vapor phase non-condensable gas is especially suited as a charging material for this process. However, we are able to treat non-condensable gases from the ordinary, so called liquid-phase cracking processes in common use today, although when using these gases as a charging material, it is desirable to use somewhat higher temperatures and pressures for the conversion than in the case of the gases from the vapor-phase cracking processes.

Fig. 1 is a diagrammatic side elevation, not drawn to scale, of an apparatus suitable for carrying out the process of this invention. Hydrocarbon gas is compressed and introduced to the process through line 1 regulated by valve 2 and passed through the heating element 3 located in furnace 4 and the heated products discharged through line 5 regulated by valve 6 into the reaction zone 7. Products from the reaction zone may be removed through line 8 and directed through line 9 regulated by valve 10 to the separator 11 or removed from line 12 regulated by valve 13. Unvaporized oil may be removed from the separator 11 through line 14 and directed to storage through line 15 regulated by valve 16 or may be removed through line 17 regulated by valve 18. Vapors and gases leave the separator 11 through line 19 regulated by valve 20 and pass into the dephlegmating zone 21 where separation of partially converted hydrocarbons and the motor fuel containing hydrocarbons and gases is effected. Partially converted hydrocarbons together with hydrocarbon oil introduced to the dephlegmator as a cooling medium flows through line 22 and valve 23, and may be withdrawn through line 24 regulated by valve 25 or may pass to the suction side of the pump 26 and be pumped through line 27 and valve 28 into line 30 and through valve 31 and passed into the heating element 3. The vapors and gases leave the dephlegmator 21 through line 32 regulated by valve 33 and pass to the condenser and/or cooler 34 and thence pass into the line 35 regulated by valve 36 into the receiver 37 where separation of liquid and gaseous products is effected. Liquid products are removed through line 93 regulated by valve 94 and gaseous products are removed through line 40 regulated by valve 41. These gases may be removed in whole or in part through line 42 regulated by valve 43 or may pass through line 44 either through line 45 regulated by valve 46 to the pump 47 and be pumped through line 48 and valve 49 into line 50. Any desirable portion of the liquid in receiver 37 may be removed through line 52 regulated by valve 53 and directed to the pump 54 which pumps this oil through line 55 and valve 56 to the top of the dephlegmator 21 to serve as a cooling agent therein. Hydrocarbon oil may be introduced to the process through line 57 and valve 58 to the suction side of pump 59 which pumps this oil through line 60 from which the oil may pass through line 61 regulated by valve 62, may be directed through line 63 regulated by valve 64 and may pass through valve 65 into line 30 leading to the heating element 3 and/or any desired portion of this oil may be directed through line 66 regulated by valve 67 and may flow into suitable portions of the reaction zone 7 or into the separator 11 as is illustrated by line 68 regulated by valve 69, line 70 regulated by valve 71, line 72, regulated by valve 73, line 74 regulated by valve 75 and line 76 regulated by valve 77.

Referring to Fig. 2, which is also a diagrammatic side elevation of a heat exchanger not drawn to scale, which may be used in place of the dephlegmator 21. In operating such a heat interchanger, the gases being removed from the receiver 37 and returned to the heating element 3 for retreatment may be passed through line 78 regulated by valve 79 into the top zone 80 of the heat exchanger 81, passing downwardly through the tubes 82 and enter the lower zone 83, leaving through line 84 regulated by valve 85 and being directed to the heating element 3 in a suitable manner. Vapors from the separator 11 may be introduced through line 86 regulated by valve 87 into the zone 88 surrounding tubes 82, uncondensed vapors and gases being removed through line 89 regulated by valve 90 and the partially condensed product removed through line 91 regulated by valve 92.

As an example of the process, non-condensable gas from a well known cracking process operated at 200 pounds per square inch is used as raw material for our process. The non-condensable gas from the high pressure receiver of the plant is compressed to 300 pounds per square inch, and fed to the inlet of the heating element 3. The temperature of the heated mass leaving this coil, and entering the reaction chamber 7 is approximately 1000° F., the pressure being somewhat less than 300 pounds per square inch due to the friction drop through the heating element 3. The vapors from the reaction chamber 7 enter the dephlegmator 21 for treatment as already described, and the distillate drawn from the receiver 37 has a gravity of approximately 47° A. P. I. A portion of the non-condensable gas from this receiver, at a pressure of approximately 250 pounds per square inch flows to the inlet side of the compressor 47 and thence back to the inlet of the heating element 3 at a pressure of approximately 300 pounds per square inch. While the distillate withdrawn from the process amounts to approximately 48% by weight of the raw gases fed to the process, the conversion of gas to distillate amounts to only 7 to 10% of that entering the heating element. According to present practice, it is found uneconomical to attempt to convert the whole of the non-condensable gas into liquid products and therefore all non-condensable gas from the receiver 37 is not recycled back to the inlet of the heating coil, about 30% being bled off from the system for use as fuel or for other purposes. The other 22% by weight of the charging gas is converted to a rather high-boiling liquid containing some tarry or coke-like materials which could be used for various purposes.

Somewhat better results can be obtained by using higher pressures, but obviously the expense of the equipment and power cost would increase, and pressures ranging from 250 to 750 pounds per square inch are adequate for ordinary purposes. Indeed using the non-condensable gas from some vapor phase processes, pressures in the neighborhood of 100 to 200 pounds per square inch and temperatures ranging from 800 to 1200° F. are satisfactory. Apparently the conversion of the non-condensable gas, into the desired liquids, involves polymerization reactions, and for this reason the use of super-atmospheric pressures are necessary. It is of course, understood that a relatively wide range of temperatures and pressures may be employed, depending upon conditions and results desired.

We claim as our invention:

1. A process for treating incondensible hydrocarbon gases which comprises passing the gas through a heating zone and subjecting the same therein to a temperature of between 800° F. and 1200° F. while under a pressure ranging from 100 to 750 pounds per square inch thereby forming low boiling condensible hydrocarbons therefrom, separating the condensible hydrocarbons thus formed from the unconverted gases by condensation, returning at least a portion of said unconverted gases to the heating zone for retreatment, and limiting the time to which the gases are subjected to the aforesaid temperature and pressure conditions so that only from 7% to 10% of the gases entering the heating zone is converted into said low boiling condensible hydrocarbons per pass through the system.

2. The process as defined in claim 1 further characterized in that a relatively cool hydrocarbon oil is injected into the heated gases discharged from the heating zone.

HAROLD C. WEBER.
WILLIAM H. McADAMS.